(No Model.)
2 Sheets—Sheet 1.
H. WILLSON.
BUILDING DIRECTORY.
No. 560,878. Patented May 26, 1896.
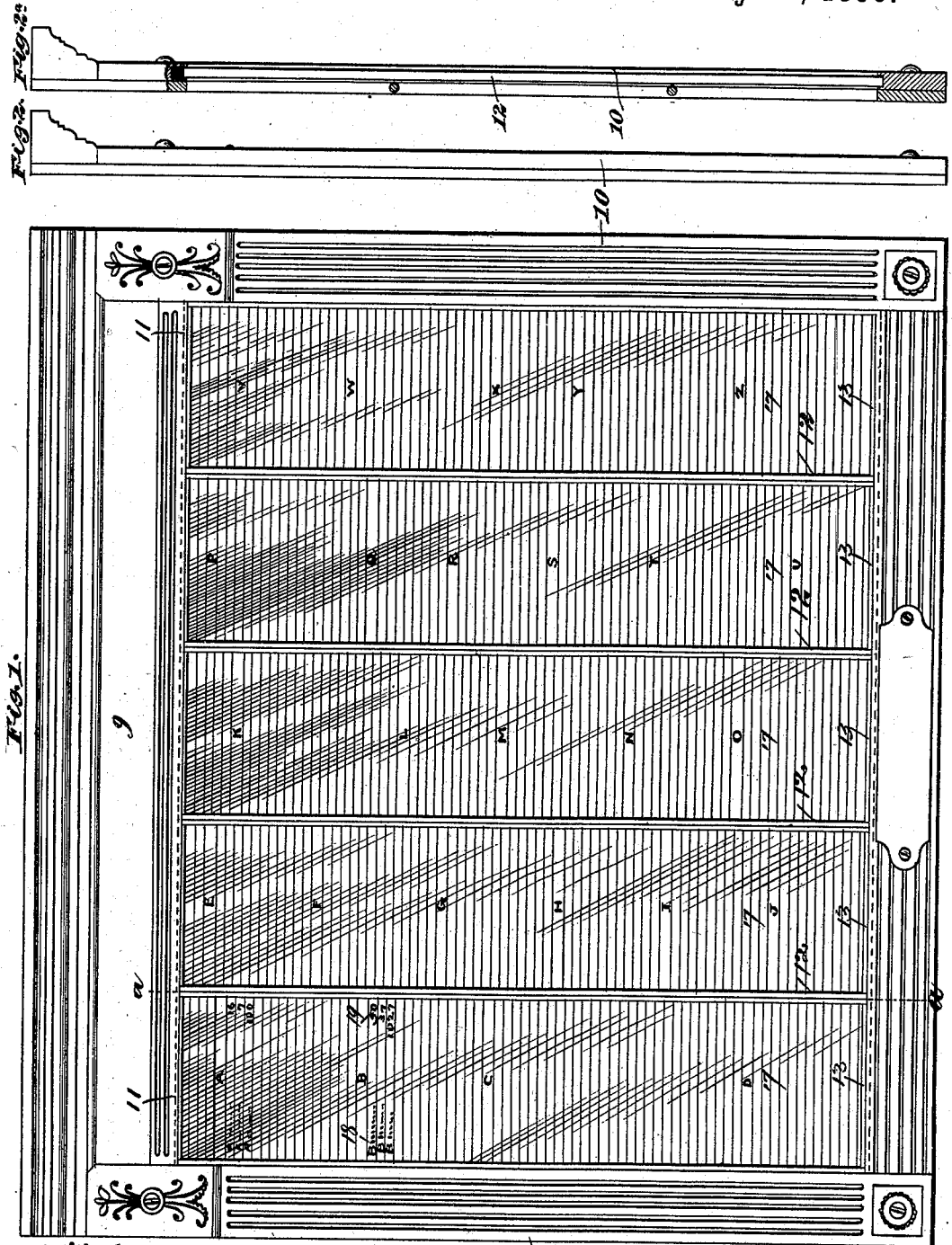
Witnesses,
Inventor:
Henry Willson
By Offield, Towle & Linthicum
Attys.

(No Model.) 2 Sheets—Sheet 2.
H. WILLSON.
BUILDING DIRECTORY.
No. 560,878. Patented May 26, 1896.
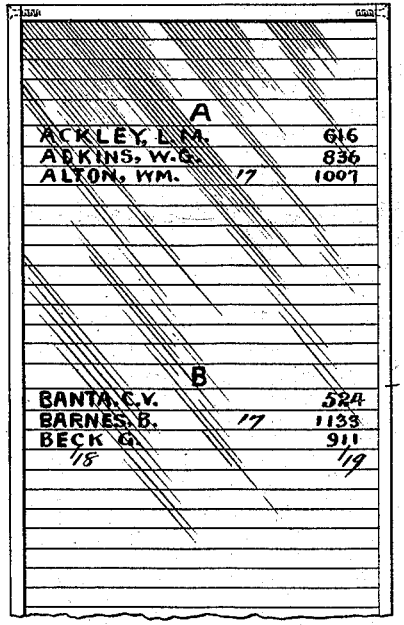
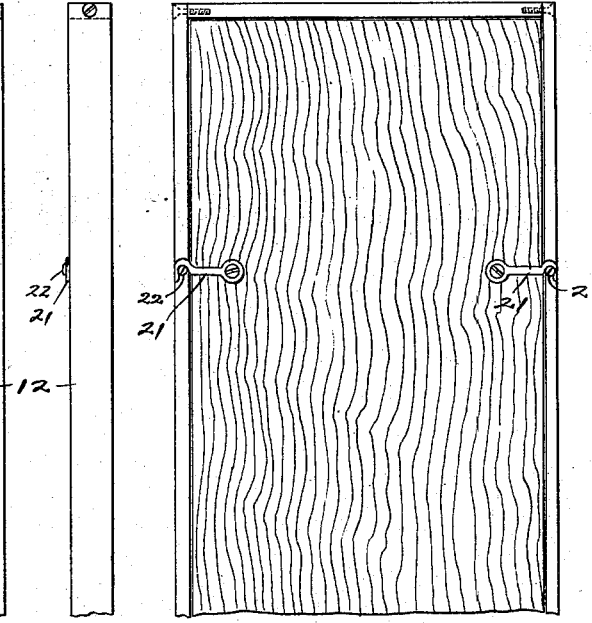
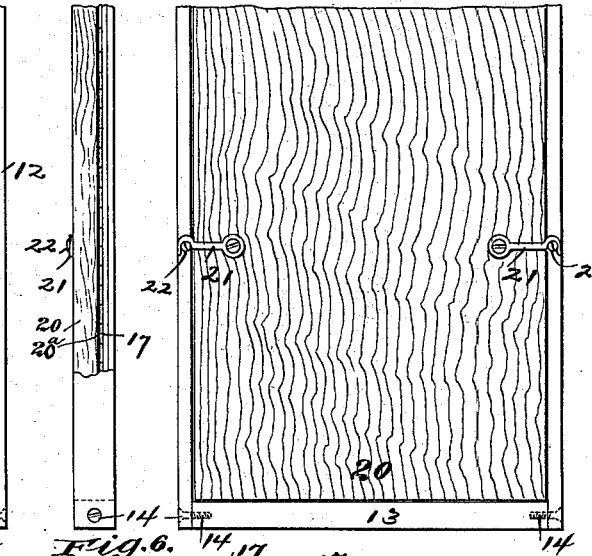
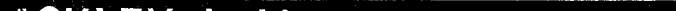
Witnesses,
Inventor,
Henry Willson
By Offield, Towle & Linthicum
Attys.

UNITED STATES PATENT OFFICE.

HENRY WILLSON, OF CHICAGO, ILLINOIS.

BUILDING-DIRECTORY.

SPECIFICATION forming part of Letters Patent No. 560,878, dated May 26, 1896.

Application filed March 11, 1895. Serial No. 541,283. (No model.)

*To all whom it may concern:*

Be it known that I, HENRY WILLSON, of Chicago, Illinois, have invented certain new and useful Improvements in Building-Directories, of which the following is a specification.

This invention relates to a building-directory particularly intended for use in office-buildings where there is a large number of tenants, and where it is desired to provide a directory in such form that it may be changed as often as necessitated by changes of tenants.

The invention is embodied in a directory having a casing or frame supporting a series of removable panels, each of the panels preferably consisting of a skeleton frame with a sheet of glass secured therein, a removable backing, and a series of name-plates removably held between the glass and the backing and adapted to receive on both sides thereof the names of tenants, each tenant's name being preferably marked upon both sides of the name-plate, so that it may be read from the front through the glass, and its location also determined when the back is removed. The name-plates are preferably made of pasteboard, and, in the preferred construction, of pasteboard having a black surface with the names marked thereon by cut white gummed letters. These name-plates may be made to slide in grooves in the panel-frames, and a sufficient number of blanks are provided, so that by the removal of a blank a name-plate bearing a new name may be inserted, or when a removal occurs the name-plate bearing the name of the tenant removed may be taken out and a blank put in its place.

In the accompanying drawings, Figure 1 is a face or front view, and Fig. 2 is an edge view, of the directory-case complete. Fig. 2ª is a section on line *a a* of Fig. 1. Figs. 3 and 4 are respectively a front and rear view of one of the panels detached. Fig. 5 is an edge view of the panel, partly in longitudinal section, the three figures last described being broken away at their middles. Fig. 6 is a transverse sectional view through one of the panels. Fig. 7 is a front or face view of one of the name-plates. Fig. 8 is a broken detail view of the back of one of the name-plates.

In the drawings, 9 represents a frame which may be of wood or metal, and provided with the cross-bars 10 to strengthen the frame and support the panels. The top and bottom pieces of the frame have grooves, as indicated by the dotted lines 11. In the illustration five panels are employed, and each of these panels consists, in the preferred construction, of a metal frame of skeleton form, rectangular in shape, composed of the side pieces 12 and the end piece 13 and held together by the screws 14. As shown in Fig. 6, these frame-pieces are provided with inwardly-opening longitudinal grooves 15 16, the former being deeper than the latter and intended to receive a sheet of glass 17, which may be inserted before one or both of the end pieces 13 are applied. In the groove 16 are affixed the name-plates 18, each of which may be composed of a thin flexible strip of pasteboard, preferably having a black background, as shown in Fig. 7. Upon this background the names are most conspicuously marked in white cut gummed letters 18, and the numbers of the room in similar letters 19. The names are indicated for inspection through the face of the sheet of glass by being carefully composed, and preferably on the back of each name-plate the same name and number are also indicated by being written or in other ways, as shown in Fig. 8. A removable back 20, in the form of a board, is fitted into the panel and secured in some convenient way, as by the hooks 21 and screws 22, so as to hold the name-plates against the back of the sheet of glass. This board back is preferably cushioned, say, with a pad or sheet of felt 20ª, and the combined thickness of the board and cushion is such that when the hooks are caught a pressure is brought to bear on the name-plates sufficient to hold them in place. Instead of this arrangement, any other means for creating a pressure on the name-plates by the securing of the back in place may be employed.

In use the frame being secured to the wall and the several panels in place with the names in order under appropriate index-letters, as indicated in Figs. 1 and 3, if it be desired to add, for example, a name-plate under letter "B" the blank name-plate must be removed and a plate bearing the proper name and number of room inserted. To do this, the panel will be raised until the lower end clears the bottom groove, the upper groove being wide enough to permit this movement when the panel is lifted out, the removable back taken out and one of the blanks removed by springing or flexing it at its middle. If the name to be added comes beneath the list of names under that letter, the first blank below the list of names will be removed. If it should happen that the name to be inserted belongs between two name-plates already bearing names, one of the blanks above or below the list of names will be removed, the name-plates slipped up or down in the groove and the new one inserted at the proper place. These changes can be made rapidly, and in large office-buildings there is necessity for changing them frequently. By means of my improved directory these changes can be made weekly at very slight expense, and the names may always be arranged in alphabetical order and the system of indexing carried as far as in city-directories.

The advantages of my invention are thus obvious. If a printed sheet be employed and there be removals or changes of tenants, the sheet must be defaced. If new tenants come in, the best that can be done, where a printed sheet is used, is to paste over the name of some tenant that has removed a strip bearing the name of the new tenant, or by placing such strip or writing the name below the list of names under that letter. Thus after a few changes of tenants a directory of the printed-sheet form becomes very unsightly.

A further advantage of my invention is that the name-plates may be prepared where most convenient and taken to the directory without interrupting the use of the latter except for the brief time necessary to make the changes.

The directory shown in the drawings has spaces for three hundred and seventy-five names, and in order to give an idea of the capacity of a directory of this character I may state that with the name-plates of the size shown in Fig. 7 eighty names may be placed in a panel two feet and six inches long by seven inches wide. Thus for four hundred names the size of the frame over all need not be over three feet square.

Obviously, instead of mounting a series of panels in a single frame each panel might be separately used and a single panel constitute a complete directory.

Obviously, some of the structural features may be modified and less than the whole number of parts above described employed, and therefore it will be understood that I do not limit my invention except as hereinafter particularly pointed out in the claims.

I claim—

1. A directory of the class described, comprising in combination a frame or holder having top and bottom grooves therein, panels adapted to be removably held in said grooves, transparent front plates in said panels, flexible name-plates removably and adjustably held in said panels and a removable back plate, substantially as described.

2. A directory of the class described, comprising in combination a skeleton frame having ways or grooves, a transparent front plate, a series of adjustable and removable name-plates constructed from a material sufficiently flexible to permit them to be sprung into and out of said grooves a removable back plate and means for securing said back plate whereby to frictionally hold the name-plates in position, substantially as described.

HENRY WILLSON.

Witnesses:
C. C. LINTHICUM,
FREDERICK C. GOODWIN.